(12) United States Patent
Stoia et al.

(10) Patent No.: US 11,465,766 B2
(45) Date of Patent: Oct. 11, 2022

(54) SYSTEMS AND METHODS FOR COOLING AND GENERATING POWER ON HIGH SPEED FLIGHT VEHICLES

(71) Applicant: The Boeing Company, Chicago, IL (US)

(72) Inventors: Michael F. Stoia, Rancho Santa Margarita, CA (US); Garrett W. Ek, O'Fallon, MO (US); Arun Muley, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 588 days.

(21) Appl. No.: 16/457,418

(22) Filed: Jun. 28, 2019

(65) Prior Publication Data
US 2020/0407072 A1 Dec. 31, 2020

(51) Int. Cl.
*B64D 33/02* (2006.01)
*B64C 1/38* (2006.01)
*B64C 30/00* (2006.01)

(52) U.S. Cl.
CPC ............... *B64D 33/02* (2013.01); *B64C 1/38* (2013.01); *B64C 30/00* (2013.01); *B64D 2033/024* (2013.01); *B64D 2033/026* (2013.01)

(58) Field of Classification Search
CPC ............. B64D 33/02; B64D 2033/024; B64D 2033/026; B64D 13/00; B64D 13/08;
(Continued)

(56) References Cited

U.S. PATENT DOCUMENTS 7,607,318 B2 10/2009 Lui et al.
7,963,100 B2 6/2011 Bakos et al.
(Continued)

FOREIGN PATENT DOCUMENTS

CN 101301931 A * 11/2008
CN 106640242 A * 5/2017
(Continued)

OTHER PUBLICATIONS

Search Report for related European Application No. 20173365.6; report dated Oct. 30, 2020.
(Continued)

*Primary Examiner* — Behrang Badii
*Assistant Examiner* — Jalal C Coduroglu
(74) *Attorney, Agent, or Firm* — Quinn IP Law (57) ABSTRACT

Methods and apparatus for cooling a surface on a flight vehicle and/or generating power include advancing the flight vehicle at a speed of at least Mach 3 to aerodynamically heat the surface. A supercritical working fluid is circulated through a fluid loop that includes compressing the supercritical working fluid through a compressor, heating the supercritical working fluid through a heat intake that is thermally coupled to the surface, expanding the supercritical working fluid in a thermal engine to generate a work output, cooling the supercritical working fluid, and recirculating the supercritical working fluid to the compressor. The work output of the thermal engine is operably coupled to the compressor, and may optionally be coupled to a generator to produce power. The supercritical working fluid absorbs heat from the surface, eliminating hot spots and permitting use of lighter and/or less expensive materials.

20 Claims, 4 Drawing Sheets

(58) Field of Classification Search
CPC ......... B64D 13/006; B64C 1/38; B64C 30/00; Y02T 50/40; Y02T 50/50; F01D 15/08; F01D 15/10; F01K 25/103
See application file for complete search history.

(56) References Cited

U.S. PATENT DOCUMENTS

| | | | |
|---|---|---|---|
| 8,327,651 B2* | 12/2012 | Finney | B64D 13/08 62/87 |
| 9,739,200 B2 | 8/2017 | Vaisman | |
| 9,758,235 B2 | 9/2017 | Clemen, Jr. et al. | |
| 9,810,158 B2* | 11/2017 | Foutch | F02C 7/18 |
| 10,054,051 B2* | 8/2018 | Foutch | F02K 3/02 |
| 10,100,744 B2* | 10/2018 | Mackin | F02C 7/27 |
| 10,221,775 B2 | 3/2019 | Apte et al. | |
| 10,329,022 B2* | 6/2019 | Fox | G01N 27/12 |
| 10,926,480 B2 | 2/2021 | Yousefiani et al. | |
| 2007/0266695 A1 | 11/2007 | Lui et al. | |
| 2009/0071166 A1* | 3/2009 | Hagen | F01K 21/047 60/775 |
| 2009/0151321 A1 | 6/2009 | Jarmon et al. | |
| 2012/0000205 A1 | 1/2012 | Coffinberry et al. | |
| 2013/0145794 A1* | 6/2013 | Rasmussen | F02C 6/04 62/611 |
| 2014/0260340 A1 | 9/2014 | Vaisman et al. | |
| 2015/0315966 A1 | 11/2015 | Magee et al. | |
| 2015/0315971 A1 | 11/2015 | Reitz et al. | |
| 2015/0330303 A1* | 11/2015 | Delgado, Jr. | F02C 6/08 60/783 |
| 2015/0337730 A1* | 11/2015 | Kupiszewski | F02C 7/16 60/39.465 |
| 2015/0380748 A1* | 12/2015 | Marich | H01M 8/04716 429/437 |
| 2016/0025339 A1* | 1/2016 | Kamath | F02C 9/40 60/782 |
| 2016/0045841 A1* | 2/2016 | Kaplan | C01B 32/05 429/49 |
| 2016/0369705 A1* | 12/2016 | Mackin | F02C 6/08 |
| 2017/0074102 A1* | 3/2017 | Plante | F01D 5/284 |
| 2017/0152050 A1* | 6/2017 | Klimpel | B64D 13/08 |
| 2017/0292412 A1* | 10/2017 | Fonseca | F01D 15/005 |
| 2018/0037327 A1* | 2/2018 | Hoffjann | B64D 13/06 |
| 2018/0118351 A1* | 5/2018 | Fox | G01N 27/12 |
| 2018/0215475 A1 | 8/2018 | Hurt et al. | |
| 2021/0205883 A1 | 7/2021 | Yousefiani et al. | |
| 2021/0205884 A1 | 7/2021 | Yousefiani et al. | |

FOREIGN PATENT DOCUMENTS

| | | | | |
|---|---|---|---|---|
| CN | 106640242 | A | | 5/2017 |
| CN | 107914862 | A * | 4/2018 | ............... F02C 7/00 |
| CN | 107150810 | B | | 6/2018 |
| CN | 108657442 | A * | 10/2018 | ............ B64D 13/06 |
| CN | 108657442 | A | | 10/2018 |
| CN | 108750123 | A | | 11/2018 |
| CN | 109989833 | A | | 7/2019 |
| CN | 108298061 | B | | 3/2020 |
| EP | 2272757 | A2 | | 7/2010 |
| EP | 3757010 | A1 | | 12/2020 |
| JP | 2002022298 | A | | 1/2002 |
| JP | 2002022298 | A * | 1/2002 | ............... F25B 9/06 |
| JP | 2009191611 | A * | 8/2009 | ............... F01D 5/03 |
| WO | WO-2007035298 | A2 * | 3/2007 | ............... F01D 5/03 |
| WO | WO-2014105334 | A1 * | 7/2014 | ............... F02C 7/00 |

OTHER PUBLICATIONS

Claudio Spadacini; The future of sCO2 Power Cycle Technology—EU Perspective; EXERGY Gruppo Industriale Maccaferri; http://sco2symposium.com/papers2018/keynote/Claudio-Spadacini.pdf; 6th International Supercritical CO2 Power Cycles Symposium; Mar. 28, 2018; 23 pages.

Qian Zhu; Innovative power generation systems using supercritical CO2 cycles; Clean Energy, vol. 1, Issue 1, Dec. 2017; pp. 68-79; https://academic.oup.eom/ce/article/1/1/68/4657149; Nov. 24, 2017.

Junhyun Cho et al.; Research on the Development of a Small-Scale Supercritical Carbon Dioxide Power Cycle Experimental Test Loop; http://sco2symposium.com/papers2016/Testing/049paper.pdf; The 5th International Symposium—Supercritical CO2 Power Cycles; Mar. 28-31, 2016; 12 pages.

\* cited by examiner

SYSTEMS AND METHODS FOR COOLING AND GENERATING POWER ON HIGH SPEED FLIGHT VEHICLES

FIELD

The present disclosure generally relates to high speed flight vehicles and, more specifically, to systems and methods for thermal management and power generation on high speed flight vehicles.

BACKGROUND

Flight vehicles traveling through atmosphere at high speeds may experience aerodynamic heating of exterior surfaces and wetted duct surfaces. When traveling at speeds greater than Mach 3, and more particularly at hypersonic speeds greater than Mach 5, the temperature of these surfaces can locally exceed 1000 degrees Celsius, necessitating the use of high density materials such as superalloys or expensive non-metallic materials such as ceramic matrix composites. Additionally, turbofan and turbojet engines cannot be used at speeds above approximately Mach 3, thereby limiting their capability to run generators to power vehicle systems.

SUMMARY

In accordance with one aspect of the present disclosure, a method of cooling a surface on a flight vehicle includes advancing the flight vehicle at a flight speed of at least Mach 3, wherein the surface of the flight vehicle is aerodynamically heated. A supercritical working fluid is circulated through a fluid loop including, in sequence, compressing the supercritical working fluid through a compressor, heating the supercritical working fluid through a heat intake of the fluid loop, wherein the heat intake of the fluid loop is thermally coupled to the surface of the flight vehicle, expanding the supercritical working fluid in a thermal engine, thereby to generate a work output from the thermal engine, cooling the supercritical working fluid, and recirculating the supercritical working fluid to the compressor. The work output of the thermal engine is operably coupled to the compressor.

In accordance with another aspect of the present disclosure, a system is provided for cooling a surface of a flight vehicle traveling at a flight speed of at least Mach 3. The system includes a fluid loop containing a supercritical working fluid. The fluid loop has, in sequence, a compressor for compressing the supercritical working fluid, a heat intake, located in thermally coupled relation to the surface of the flight vehicle, for heating the supercritical working fluid, a thermal engine for expanding the supercritical working fluid and generating a work output, wherein the work output is operably coupled to the compressor, and a recuperator for exchanging heat from a low pressure leg of the fluid loop, located downstream of the thermal engine, to a high pressure leg of the fluid loop, located upstream of both the thermal engine and the heat intake of the fluid loop.

In accordance with a further aspect of the present disclosure, a system is provided for cooling a surface of a flight vehicle and generating electrical power. The system includes a fluid loop containing a supercritical working fluid. The fluid loop has, in sequence, a compressor for compressing the supercritical working fluid, a heat intake, located in thermally coupled relation to the surface of the flight vehicle, for heating the supercritical working fluid, a thermal engine for expanding the supercritical working fluid and generating a work output, wherein the work output is operably coupled to the compressor, a recuperator for exchanging heat from a low pressure leg of the fluid loop, located downstream of the thermal engine, to a high pressure leg of the fluid loop, located upstream of both the thermal engine and the heat intake of the fluid loop. A generator is operably coupled to the thermal engine and configured to receive at least a portion of the work output and generate auxiliary electrical power. A controller is operably coupled to the compressor, wherein the controller is programmed to execute a method, comprising initiating operation of the compressor when a flight speed of the flight vehicle is above Mach 3.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of illustrative examples of the present disclosure when read in conjunction with the accompanying drawings, wherein:

DETAILED DESCRIPTION

The figures and the following description illustrate specific examples of the claimed subject matter. It will thus be appreciated that those skilled in the art will be able to devise various arrangements that, although not explicitly described or shown herein, embody the principles of the examples and are included within the scope of the examples. Furthermore, any examples described herein are intended to aid in understanding the principles of construction, operation, or other features of the disclosed subject matter, and are to be construed as being without limitation to such specifically recited examples and conditions. As a result, the inventive concept(s) is not limited to the specific examples described below, but by the claims and their equivalents.

Examples described herein cool a surface of a high speed flight vehicle by circulating a supercritical working fluid through a fluid loop having a compressor and a heat engine. When the flight vehicle travels above Mach 3, portions of the surface of the flight vehicle may reach 1000 degrees C. or more. The supercritical working fluid absorbs heat from the flight vehicle surface, thereby eliminating hot spots and permitting use of lighter and/or less expensive materials. The magnitude of heat generated at high speeds and absorbed by the working fluid maintains the working fluid in a supercritical state, allowing the compressor, heat engine, and other components of the cooling system to be smaller and lighter. Still further, the heat absorbed by the working fluid may be used to generate electrical power for the flight vehicle. The supercritical state of the working fluid improves thermal efficiency of the system which, in combination with the use of lightweight turbomachinery, results in a power source that is compact, lightweight, and efficient compared to conventional batteries or fuel cells.

Figure 1:
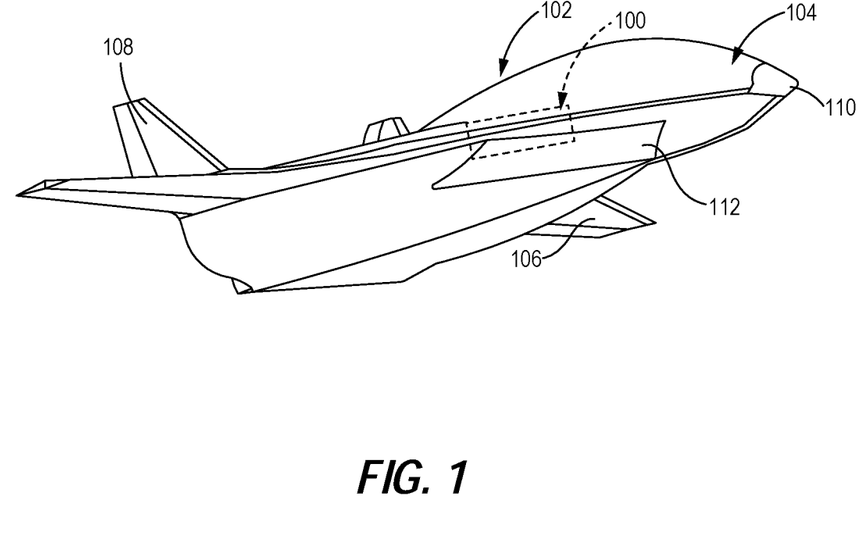
FIG. 1 is a perspective view of a high speed flight vehicle having an integrated cooling and power generation system according to the present disclosure.

FIG. 1 illustrates an example of a high speed flight vehicle 102. The flight vehicle 102 may be operated manned or unmanned as desired. The flight vehicle 102 is just one configuration of a flight vehicle capable of traveling at a speed of at least Mach 3, and other configurations, not shown, may be implemented as desired. For example, the flight vehicle 102 may have a different shape, size, aspect ratio, etc., as desired. Thus, the flight vehicle 102 is merely shown in a particular configuration for purposes of discussion.

In this example, the flight vehicle 102 has a surface 104 exposed to aerodynamic heating. In some examples, the surface 104 is provided on a leading surface, such as on a wing 106, tail 108, nose cap 110, or inlet duct 112 of the flight vehicle 102. During operation of the flight vehicle 102 above Mach 3, or in hypersonic flight (e.g., the flight vehicle 102 moves at hypersonic speeds of Mach 5 and above), the surface 104 is aerodynamically heated. For example, the temperature of the surface 104 can exceed 1000 degrees Celsius.

Figure 2:
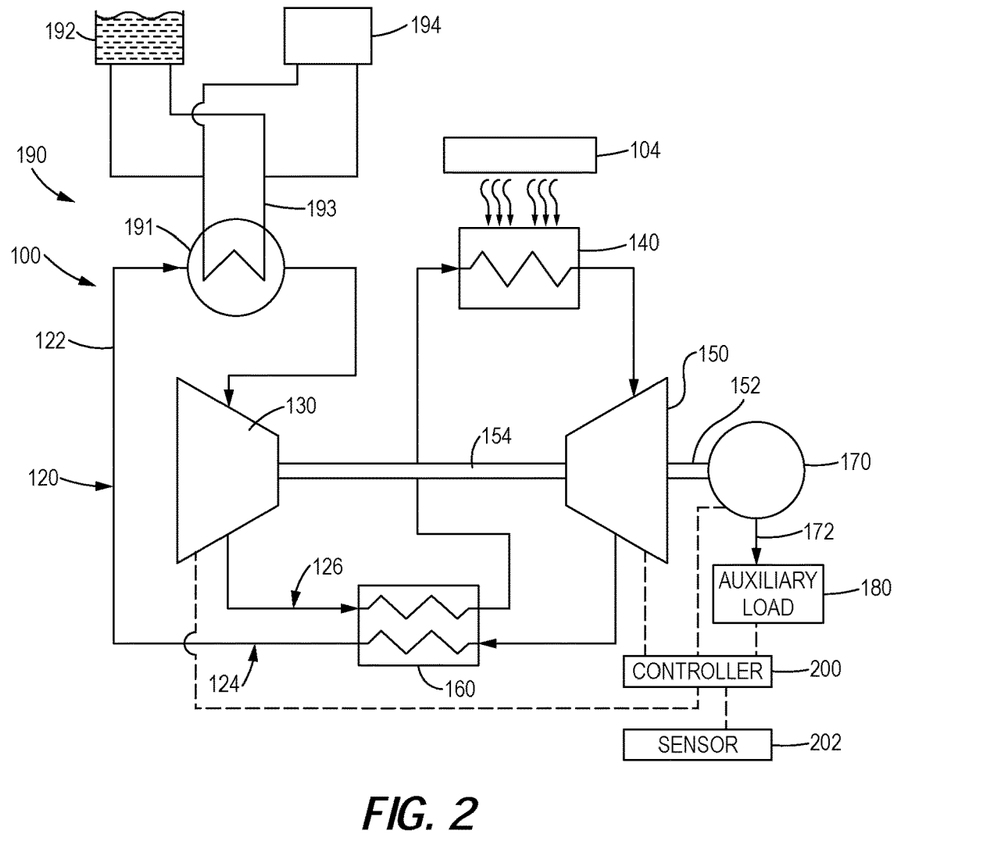
FIG. 2 is a schematic illustration of the integrated cooling and power generation system.
Figure 3:
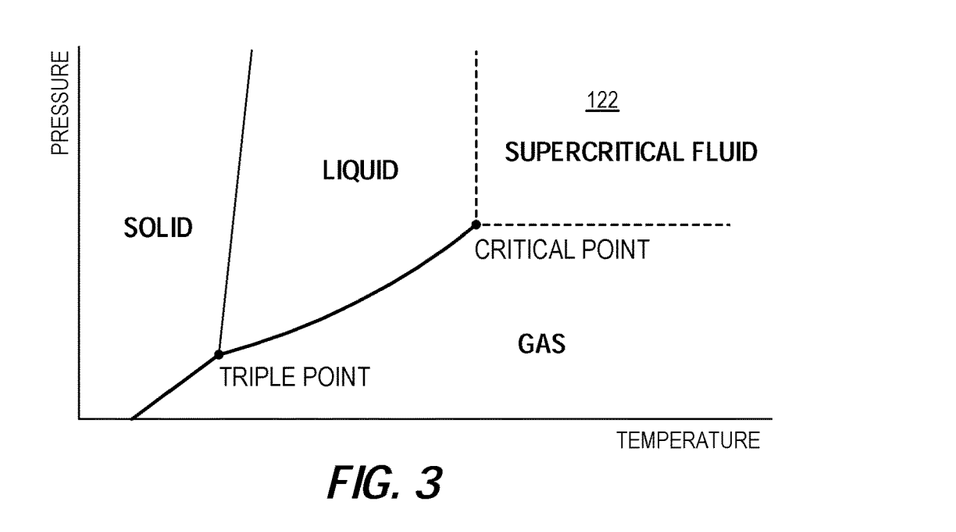
FIG. 3 is a graph illustrating an exemplary supercritical fluid for use in the integrated cooling and power generation system.

The flight vehicle 102 includes a system 100 for cooling the surface 104, thereby allowing the surface 104 to be formed of lower cost and/or lighter materials. As best shown in FIG. 2, the system 100 includes a fluid loop 120 through which is circulated a working fluid 122. In the illustrated example, the fluid loop 120 is formed as a closed loop. When the flight vehicle 102 is operated at speeds above Mach 3, heat from the surface 104 is transferred to the working fluid 122 in the fluid loop 120, thereby to maintain the working fluid 122 at a temperature and pressure above its critical point. FIG. 3 graphically illustrates the critical point of a substance, where temperatures and pressures above the critical point will result in a supercritical state. In some examples, the working fluid is supercritical carbon dioxide.

The system 100 includes components disposed in the fluid loop 120 for performing a sequence of thermodynamic processes involving transfer of heat and work into and out of the system 100, while varying temperature and pressure of the working fluid 122 within the system. As schematically illustrated in FIG. 2, the system 100 includes a compressor 130 for compressing the supercritical working fluid 122 to an increased pressure. The system 100 further includes a heat intake 140 that absorbs heat from a source external to the fluid loop 120 to heat the supercritical working fluid 122. In the illustrated example, the external source is the surface 104 of the flight vehicle 102, and the heat intake 140 is a section of the fluid loop 120 that is located in thermally coupled relation to the surface 104.

The system 100 further includes a thermal engine 150 that extracts work output 152 from the supercritical working fluid by expanding the supercritical working fluid 122 to a decreased pressure. While FIG. 2 schematically illustrates the thermal engine 150 as a turbine, other types of thermal engines capable of extracting work output from a heated and pressurized working fluid may be used. In the illustrated example, the work output 152 is in the form of a rotating output shaft of the turbine that is mechanically coupled to the compressor 130 by a shaft 154, thereby to operate the compressor 130. As discussed in greater detail below, however, the work output 152 may be electrically coupled to the compressor 130, as well as to an electric power generating device. Additionally, it will be appreciated that the compressor 130 and the thermal engine 150 generally divide the fluid loop 120 into a low pressure leg 124, extending downstream of the thermal engine 150 to an inlet of the compressor 130, and a high pressure leg 126, extending upstream of the thermal engine 150 to an outlet of the compressor 130.

A recuperator 160 is provided to improve the thermal efficiency of the system 100. As schematically illustrated in FIG. 2, the recuperator 160 transfers heat from the low pressure leg 124 of the fluid loop 120 to the high pressure leg 126 of the fluid loop. Accordingly, the recuperator 160 alternatively may be referred to as a heat exchanger. By transferring heat to the working fluid 122 prior to further being heated by the heat intake 140 increases the temperature of the working fluid 122 entering the thermal engine 150, thereby increasing the amount of work output 152 that can be extracted from the working fluid.

A controller 200 may be provided to control operation of the system 100. In FIG. 2, the controller 200 is operably coupled to the compressor 130, and is programmed to execute a method that includes initiating operation of the compressor 130 when one or more operating conditions of the flight vehicle 102 is favorable for maintaining the working fluid 122 in a supercritical state. In some examples, the operating condition is temperature of the surface 104, in which case the controller 200 receives feedback from a sensor 202 configured to detect a temperature of the surface 104 and is programmed to start the compressor 130 when the surface 104 of the flight vehicle 102 exceeds a threshold temperature. Exemplary threshold temperatures include, but are not limited to, 500 degrees C., 600 degrees C., 700 degrees C., 800 degrees C., 900 degrees C., and 1000 degrees C. In other examples, the operating condition is a flight speed of the flight vehicle 102, which is indicative of temperature of the surface 104. In these examples, the controller 200 receives an indication of flight speed, such as from an input command or sensor 202 when configured to determine flight speed, and is programmed to start the compressor 130 when the flight vehicle reaches a threshold flight speed. Exemplary threshold flight speeds include, but are not limited to, Mach 3, Mach 3.5, Mach 4, and hypersonic speed. Additionally, the controller 200 may be operably coupled to the thermal engine 150.

While the specific hardware implementation of controller 200 is subject to design choices, one particular example includes one or more processors coupled with a current driver. The one or more processors may include any electronic circuits and/or optical circuits that are able to perform the functions described herein. For example, the processor(s) may perform any functionality described herein for controller 200. The processor(s) may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

The system 100 is configured to maintain the working fluid 122 in a supercritical state during the entire thermodynamic cycle, thereby enabling the use of lighter and more compact turbomachinery. When the working fluid 122 is carbon dioxide, for example, the critical temperature is approximately 31 degrees C. and the critical pressure is approximately 74 bar. Aerodynamic heating of the surface 104 increases with the speed of the flight vehicle 102. For example, at a speed of Mach 3.5, localized portions of the surface 104 reach 400 degrees C. or more, which would be sufficient to maintain the working fluid 122 in the supercritical state. At hypersonic speeds in excess of Mach 5, localized portions of the surface 104 may reach 1000 degrees C. Thermodynamic efficiency of the system 100 increases with the temperature of the surface 104. Additionally, the compressor 130 is sized to maintain a pressure of the working fluid 122 above the critical pressure throughout the thermodynamic cycle. Because the working fluid 122 is in a supercritical state, the compressor 130 and the thermal engine 150 may have a reduced size and weight, making the system 100 feasible for use on board the flight vehicle 102. Additionally, the illustrated system 100 is a closed loop system that is provided independent of a propulsion system of the flight vehicle 102.

In some examples, the system 100 is further configured to generate electrical power 172. As schematically shown in FIG. 2, the system 100 may include a generator 170 operably coupled to the thermal engine 150. The generator 170 receives at least a portion of the work output 152 from the thermal engine 150 and generates the electrical power 172. In this example, an auxiliary load 180 is operably coupled to the generator 170 and is configured to operate using the electrical power 172. In other examples, the electrical power 172 may be a primary source of power used to operate engine generators. The controller 200 further may be operably coupled to the generator 170 and the auxiliary load 180, thereby to control operation or other aspects of those components. In examples where a generator 170 is included, the system 100 may be referred to alternatively as an integrated cooling and power generation system 100. Because of the thermal efficiency, compact size, and reduced weight afforded by the use of a supercritical working fluid 122, the integrated cooling and power generation system 100 achieves gravimetric and volumetric power densities that are an order of magnitude greater than batteries or other conventional power sources.

The system 100 further may include a precooler 190 for removing excess heat from the working fluid 122. As schematically illustrated in FIG. 2, the precooler 190 includes a precooler heat exchanger 191 disposed in the low pressure leg 124 of the fluid loop 120, between the recuperator 160 and the compressor 130. By removing heat from the working fluid 122, the precooler 190 ensures that the temperature of working fluid 122 does not exceed the rated operating temperature range for the compressor 130. The excess heat may be rejected to the surrounding atmosphere or transferred to a secondary fluid in another system on board the flight vehicle 102. In the illustrated example, the precooler 190 further includes a heat sink loop 193 passing through the precooler heat exchanger 191. The heat sink loop 193 carries the excess waste heat to a storage structure, such as vessel containing heat sink fluid 192 (e.g., fuel, water, or other fluid carried on board the flight vehicle 102), or a thermal energy storage device 194. Subsequently, the excess waste heat may be used to generate additional power, provide heat to other systems on board the flight vehicle 102, or simply dissipated to the surrounding environment.

Figure 4:
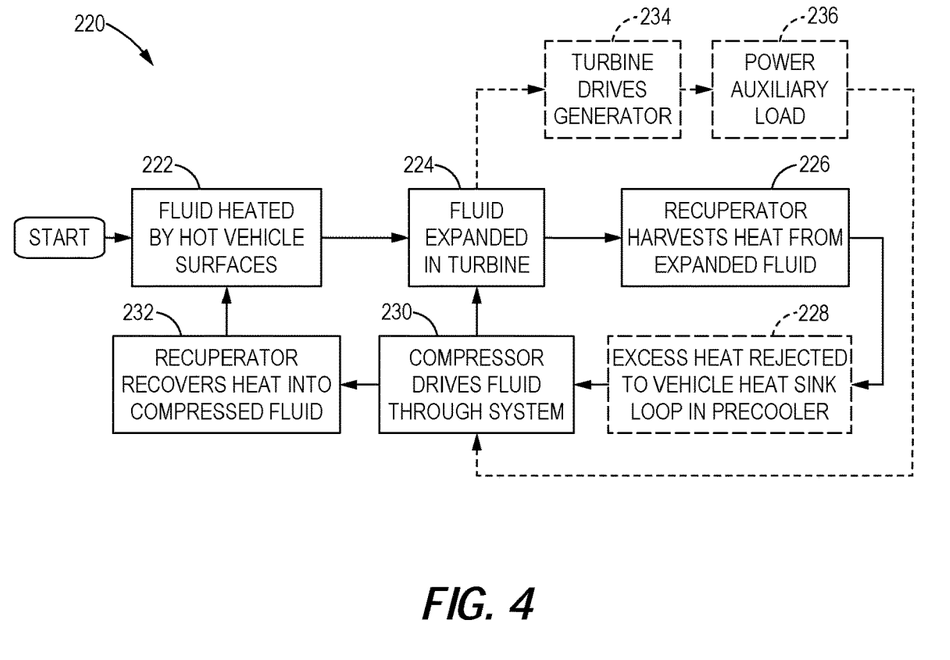
FIG. 4 is a block diagram of an example of the integrated cooling and power generation system having a mechanical connection between a turbine and a compressor of the system.

FIG. 4 is a block diagram 220 illustrating the thermodynamic cycle during operation of the system 100 when the compressor 130 is mechanically driven. At block 222, the working fluid 122 is heated by the surface 104 via the heat intake 140. At block 224, the working fluid 122 is expanded in the thermal engine 150 to obtain the work output 152, which in the illustrated example is a rotating shaft. Next, at block 226, heat from the expanded working fluid 122 is transferred from the low pressure leg 124 of the fluid loop 120 to the high pressure leg 126 by the recuperator 160. In this manner, recuperator 160 harvests heat from the expanded working fluid 122. Block 228 illustrates the optional step of transferring excess heat from the working fluid 122 to the heat sink loop 193 using the precooler 190. In this manner, excess heat is rejected to the vehicle heat sink loop 193. At block 230, the compressor 130 compresses the working fluid 122 thereby to drive the working fluid 122 through the system (e.g., the fluid loop 120). In this example, the compressor 130 is mechanically coupled to the thermal engine 150 by the shaft 154, so that the work output 152 directly and mechanically operates (e.g., drives) the compressor 130. Block 232 schematically illustrates heating the working fluid 122 via the recuperator 160. In this manner, the temperature of the working fluid 122, which is in a compressed state, is pre-heated. The working fluid 122 then reaches the heat intake 140 at block 222, where the cycle is repeated. Block 234 illustrates the optional step of using at least a portion of the work output 152 to drive the generator 170, and block 236 illustrates the optional step of powering the auxiliary load 180 off of the generator. Therefore, in this example, the work output 152 from the thermal engine 150 both mechanically operates the compressor 130 and generates electrical power in the generator 170.

Figure 5:
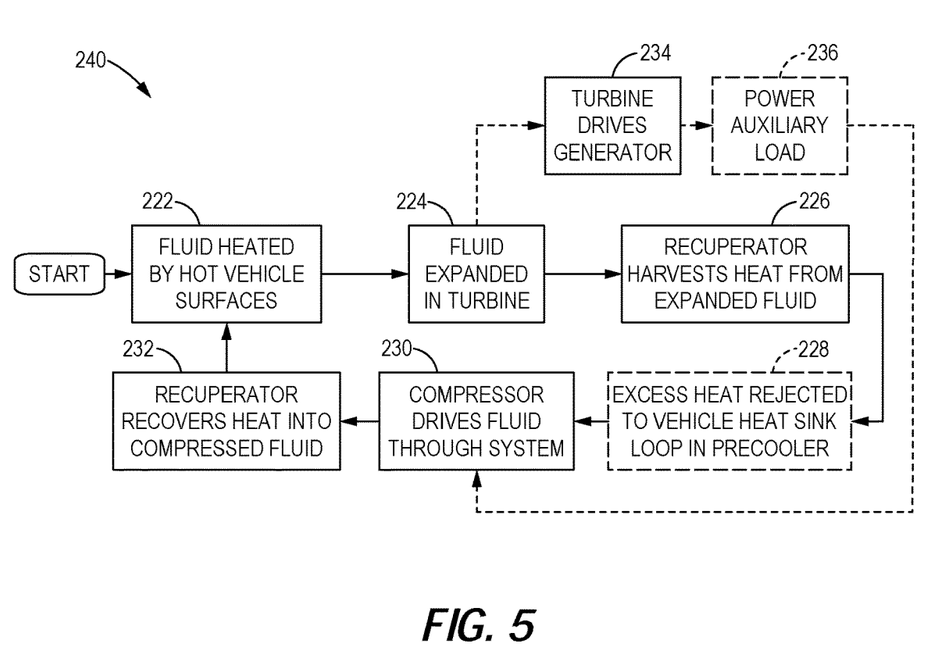
FIG. 5 is a block diagram of another example of the integrated cooling and power generation system having an electrical connection between a turbine and a compressor of the system.

FIG. 5 is a block diagram 240 illustrating the thermodynamic cycle in a system 100 having an electrically-driven compressor 130. The stages of the cycle are identical to those shown in FIG. 4, except for how the work output 152 is used, and therefore the description of this example will focus only on those differences. Notably, the system 100 omits the shaft 154 extending between the thermal engine 150 and the compressor 130. Driving the generator 170 using the work output 152, illustrated at block 234, is no longer optional but required. The compressor 130 is electrically coupled to the generator 170, thereby to drive the compressor 130. Powering the auxiliary load 180, shown at block 236, is still optional and may be omitted, in which case the generator 170 is directly coupled to the compressor 130. Therefore, in this example, the work output 152 from the thermal engine 150 is entirely converted to electrical power, which may be used to operate the compressor 130 and, optionally, the auxiliary load 180.

Figure 6:
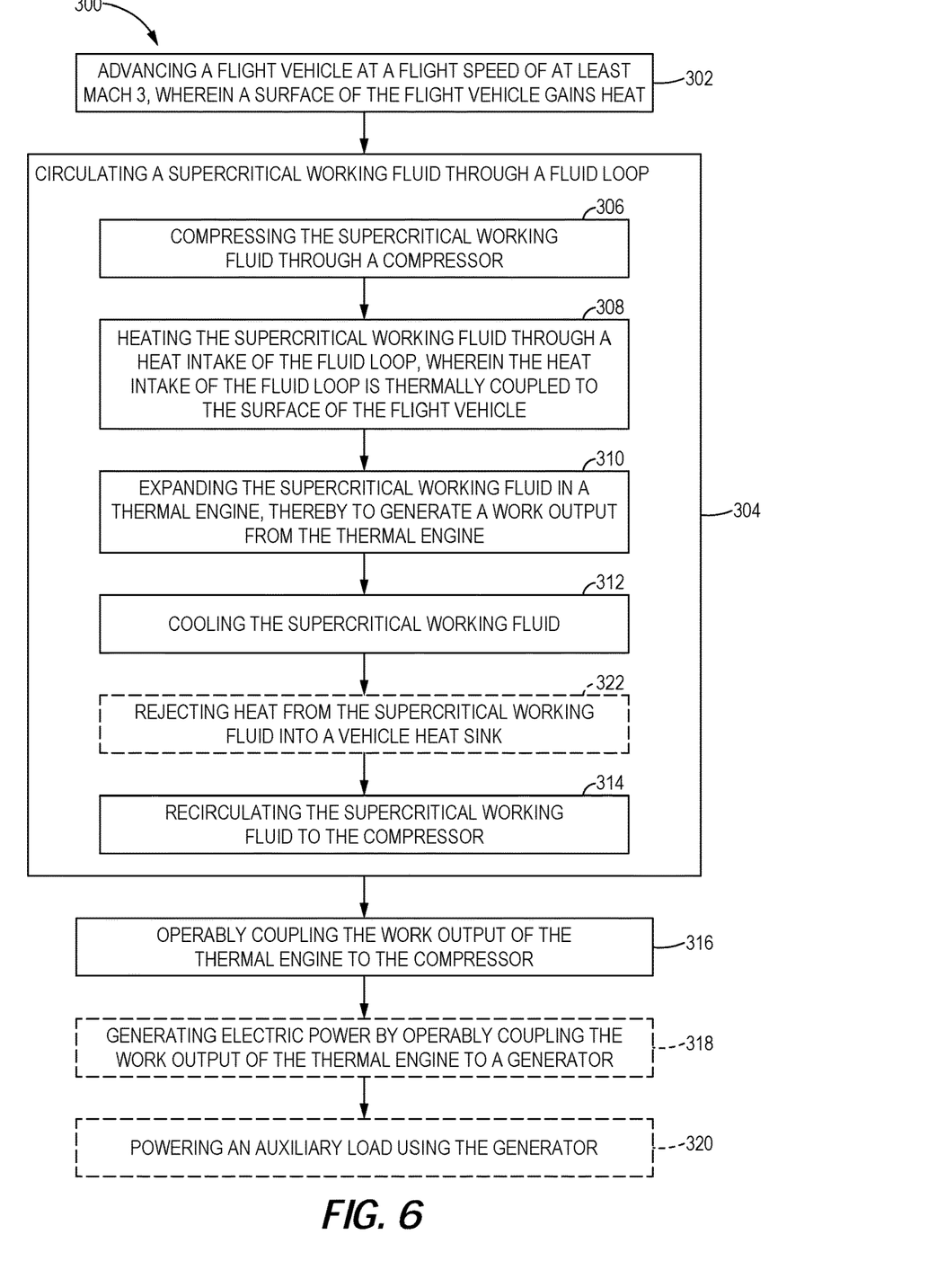
FIG. 6 is a block diagram illustrating a method of cooling an exterior surface of the high speed flight vehicle of FIG. 1, with optional power generation.

FIG. 6 is a block diagram illustrating a method 300 of cooling the exterior surface 104 of the high speed flight vehicle 102, with optional power generation. The method 300 begins at block 302 by advancing the flight vehicle 102 at a flight speed of at least Mach 3, wherein the surface 104 of the flight vehicle 102 gains heat. At block 304, a supercritical working fluid 122 is circulated through a fluid loop 120. Circulation of the working fluid 122 includes, in sequence, compressing the supercritical working fluid 122 through a compressor 130 as shown at block 306, heating the supercritical working fluid 122 through a heat intake 140 of the fluid loop 120 at block 308, wherein the heat intake 140 of the fluid loop 120 is thermally coupled to the surface 104 of the flight vehicle 102, and expanding the supercritical working fluid 122 in a thermal engine 150 at block 310, thereby to generate a work output 152 from the thermal engine 150. Circulation of the working fluid 122 through the fluid loop 120 further includes cooling the supercritical working fluid 122 at block 312, and recirculating the supercritical working fluid 122 to the compressor 130 at block 314. The method 300 continues at block 316 by operably coupling the work output 152 of the thermal engine 150 to the compressor 130. In this manner, the method 300 absorbs heat from the surface 104 of the flight vehicle 102, thereby allowing the surface 104 to be formed of lower cost and/or lighter materials, and uses the absorbed heat to operate the compressor 130.

The method 300 may include additional, optional steps for generating electrical power. For example, as schematically shown in FIG. 6, the method 300 may include generating electric power by operably coupling the work output 152 of the thermal engine 150 to a generator 170 at block 318. The electrical power from the generator 170 may be used to operate the compressor 130, when the compressor 130 is an electric-powered compressor. Additionally or alternatively, the electrical power from the generator 170 may be used to power an auxiliary load 180, as shown at block 320.

Still further, the method 300 may optionally include an additional step to reduce the temperature of the working fluid 122 to be within a recommended range for the compressor 130. Specifically, the method 300 may include rejecting heat from the supercritical working fluid 122 using a precooler 190 prior to recirculating the supercritical working fluid 122 to the compressor 130, as shown at block 322.

The term "sequence," as used herein, generally refers to elements (e.g., unit operations) in order. Such order can refer to process order, such as, for example, the order in which a fluid flows from one element to another. In an example, a compressor, heat storage unit and turbine in sequence includes the compressor upstream of the heat exchange unit, and the heat exchange unit upstream of the turbine. In such a case, a fluid can flow from the compressor to the heat exchange unit and from the heat exchange unit to the turbine. A fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific examples were described herein, the scope is not limited to those specific examples. Rather, the scope is defined by the following claims and any equivalents thereof.

What is claimed is:

1. A method of cooling an exterior surface of a flight vehicle, the method comprising:
   advancing the flight vehicle at a flight speed of at least Mach 3, wherein the exterior surface of the flight vehicle is aerodynamically heated;
   circulating a supercritical working fluid through a fluid loop including, in sequence:
      compressing the supercritical working fluid through a compressor;
      heating the supercritical working fluid through a heat intake of the fluid loop, wherein the heat intake of the fluid loop is thermally coupled to the exterior surface of the flight vehicle;
      expanding the supercritical working fluid in a thermal engine, thereby to generate a work output from the thermal engine;
      cooling the supercritical working fluid; and
      recirculating the supercritical working fluid to the compressor; and
   operably coupling the work output of the thermal engine to the compressor.

2. The method of claim 1, further comprising generating electric power by operably coupling the work output of the thermal engine to a generator.

3. The method of claim 2, in which the compressor comprises an electric-powered compressor operably coupled to the generator.

4. The method of claim 2, further comprising powering an auxiliary load using the generator.

5. The method of claim 1, in which cooling the supercritical working fluid comprises exchanging heat from a low pressure leg of the fluid loop, located downstream of the thermal engine, to a high pressure leg of the fluid loop, located upstream of both the thermal engine and the heat intake of the fluid loop.

6. The method of claim 5, in which a recuperator is provided to exchange heat from the low pressure leg of the fluid loop to the high pressure leg of the fluid loop.

7. The method of claim 1, further comprising rejecting heat from the supercritical working fluid via a precooler prior to recirculating the supercritical working fluid to the compressor.

8. The method of claim 1, in which the supercritical working fluid comprises supercritical carbon dioxide.

9. A system for cooling an exterior surface of a flight vehicle traveling at a flight speed of at least Mach 3, the system comprising:
   a fluid loop containing a supercritical working fluid, the fluid loop including, in sequence,
   a compressor for compressing the supercritical working fluid;

a heat intake, located in thermally coupled relation to the exterior surface of the flight vehicle, for heating the supercritical working fluid due to the exterior surface of the flight vehicle being aerodynamically heated;

a thermal engine for expanding the supercritical working fluid and generating a work output, wherein the work output is operably coupled to the compressor; and a recuperator for exchanging heat from a low pressure leg of the fluid loop, located downstream of the thermal engine, to a high pressure leg of the fluid loop, located upstream of both the thermal engine and the heat intake of the fluid loop.

10. The system of claim 9, further comprising a generator operably coupled to the thermal engine and configured to receive at least a portion of the work output and generate electrical power.

11. The system of claim 10, in which the compressor comprises an electric-powered compressor operably coupled to the generator.

12. The system of claim 9, further comprising a precooler operably coupled to the low pressure leg of the fluid loop between the recuperator and the compressor.

13. The system of claim 9, further comprising a controller operably coupled to the compressor, wherein the controller is programmed to execute a method, comprising initiating operation of the compressor when an operating condition of the flight vehicle exceeds an operating threshold.

14. The system of claim 13, in which the operating condition of the flight vehicle comprises a temperature of the exterior surface.

15. The system of claim 13, in which the operating condition of the flight vehicle comprises the flight speed of the flight vehicle.

16. A system for cooling an exterior surface of a flight vehicle and generating electrical power, the system comprising:

a fluid loop containing a supercritical working fluid, the fluid loop including, in sequence:
    a compressor for compressing the supercritical working fluid;
    a heat intake, located in thermally coupled relation to the exterior surface of the flight vehicle, for heating the supercritical working fluid due to the exterior surface of the flight vehicle being aerodynamically heated;
    a thermal engine for expanding the supercritical working fluid and generating a work output, wherein the work output is operably coupled to the compressor;
    a recuperator for exchanging heat from a low pressure leg of the fluid loop, located downstream of the thermal engine, to a high pressure leg of the fluid loop, located upstream of both the thermal engine and the heat intake of the fluid loop; and
    a generator operably coupled to the thermal engine and configured to receive at least a portion of the work output and generate auxiliary electrical power; and
a controller operably coupled to the compressor, wherein the controller is programmed to execute a method, comprising initiating operation of the compressor when a flight speed of the flight vehicle is above Mach 3.

17. The system of claim 16, in which the compressor comprises an electric-powered compressor operably coupled to the generator.

18. The system of claim 16, further comprising an auxiliary load operably coupled to the generator.

19. The system of claim 16, further comprising a precooler operably coupled to the low pressure leg of the fluid loop between the recuperator and the compressor.

20. The system of claim 19, in which the precooler comprises a heat sink fluid or a thermal energy storage device.

* * * * *